(12) United States Patent
Eden

(10) Patent No.: US 6,759,983 B2
(45) Date of Patent: Jul. 6, 2004

(54) METHOD AND DEVICE FOR PRECISE GEOLOCATION OF LOW-POWER, BROADBAND, AMPLITUDE-MODULATED SIGNALS

(75) Inventor: Richard C. Eden, Briarcliff, TX (US)

(73) Assignee: Strategic Analysis, Inc., Arlington, VA (US)

( * ) Notice: Subject to any disclaimer, the term of this patent is extended or adjusted under 35 U.S.C. 154(b) by 15 days.

(21) Appl. No.: 10/107,811

(22) Filed: Mar. 28, 2002

(65) Prior Publication Data

US 2002/0167445 A1 Nov. 14, 2002

Related U.S. Application Data

(60) Provisional application No. 60/279,114, filed on Mar. 28, 2001.

(51) Int. Cl.[7] .............................. G01S 3/02; G01S 3/16
(52) U.S. Cl. ....................................... 342/451; 342/383
(58) Field of Search ................................ 342/451, 383, 342/368

(56) References Cited

U.S. PATENT DOCUMENTS

| 4,134,113 A | 1/1979 | Powell |
| 4,170,774 A | 10/1979 | Schaefer |
| 4,193,074 A | 3/1980 | Schwartz et al. |
| 4,202,246 A | 5/1980 | Schertz et al. |
| 4,243,993 A | 1/1981 | Lamberty et al. |
| 4,321,601 A | 3/1982 | Richman |
| 4,380,013 A | 4/1983 | Slysh |
| 4,380,766 A | 4/1983 | Bachtiger |
| 4,387,373 A | 6/1983 | Longuemare, Jr. |
| 4,420,839 A | 12/1983 | Hogerheiden, Jr. |
| 4,524,359 A | 6/1985 | Champagne |
| 4,525,716 A | 6/1985 | Carlin |
| 4,538,150 A | 8/1985 | Bone, Jr. |

(List continued on next page.)

OTHER PUBLICATIONS

"Detectors," http://www.hp.com/go/mta, 2001, pp. 55–64.

*Primary Examiner*—Thomas H. Tarcza
*Assistant Examiner*—Fred H. Mull
(74) *Attorney, Agent, or Firm*—Morrison & Foerster LLP

(57) ABSTRACT

The invention relates to methods and devices for precise geolocation of low-power, broadband, amplitude-modulated rf and microwave signals having poor coherency. The invention provides a basis for dramatic improvements in RF receiver technology, offering much higher sensitivity, very strong rejection of unintended signals, and novel direction finding techniques. When mounted on an airborne surveillance platform, the invention can detect and geolocate weak, broadband, incoherent RF and/or microwave signals. Embodiments of the invention are implemented by dual channel receivers (heterodyne or tuned-RF) that use crystal detection and Fast Fourier Transform (FFT) analysis for geolocation. Geolocation is accomplished using a subsystem of phased arrays and an angle of arrival technique.

53 Claims, 9 Drawing Sheets

U.S. PATENT DOCUMENTS

| | | |
|---|---|---|
| 4,605,934 A | 8/1986 | Andrews |
| 4,608,566 A | 8/1986 | Ennis et al. |
| 4,652,882 A | 3/1987 | Shovlin et al. |
| 4,656,479 A | 4/1987 | Kirimoto et al. |
| 4,658,256 A | 4/1987 | Piele |
| 4,811,426 A | 3/1989 | Pergande |
| 4,912,477 A | 3/1990 | Lory et al. |
| 4,926,184 A | 5/1990 | Galati et al. |
| 4,958,166 A | 9/1990 | Branigan et al. |
| 4,972,431 A | 11/1990 | Keegan |
| 4,978,961 A | 12/1990 | Williams, deceased et al. |
| 5,049,888 A | 9/1991 | Prenat |
| 5,081,459 A | 1/1992 | Guillerot et al. |
| 5,113,278 A | 5/1992 | Degura et al. |
| 5,142,505 A | 8/1992 | Peynaud |
| 5,191,349 A | 3/1993 | Dinsmore et al. |
| 5,206,654 A | 4/1993 | Finkelstein et al. |
| 5,270,718 A | 12/1993 | DiDomizio |
| 5,274,389 A | 12/1993 | Archer et al. |
| 5,307,077 A | 4/1994 | Branigan et al. |
| 5,334,984 A | 8/1994 | Akaba |
| 5,359,934 A | 11/1994 | Ivanov et al. |
| 5,365,450 A | 11/1994 | Schuchman et al. |
| 5,371,503 A | 12/1994 | Bower |
| 5,471,215 A | 11/1995 | Fukuhara et al. |
| 5,526,001 A | 6/1996 | Rose et al. |
| 5,541,606 A | 7/1996 | Lennen |
| 5,546,089 A | 8/1996 | Talbot |
| 5,565,870 A | 10/1996 | Fukuhara et al. |
| 5,602,554 A | 2/1997 | Cepas et al. |
| 5,608,409 A * | 3/1997 | Rilling ...................... 342/383 |
| 5,612,702 A | 3/1997 | Kinsey |
| 5,726,657 A | 3/1998 | Pergande et al. |
| 5,731,783 A | 3/1998 | Graham |
| 5,774,829 A | 6/1998 | Cisneros et al. |
| 5,784,022 A | 7/1998 | Kupfer |
| 5,815,538 A | 9/1998 | Grell et al. |
| 5,966,092 A | 10/1999 | Wagner et al. |
| 5,986,605 A | 11/1999 | Priebe et al. |
| 6,018,312 A | 1/2000 | Haworth |
| 6,018,317 A | 1/2000 | Dogan et al. |
| 6,118,402 A | 9/2000 | Kupfer |
| 6,133,865 A | 10/2000 | Alpers |
| 6,195,035 B1 | 2/2001 | Wood |
| 6,222,480 B1 | 4/2001 | Kuntman et al. |
| 6,246,359 B1 | 6/2001 | Asano et al. |
| 6,278,396 B1 | 8/2001 | Tran |
| 6,313,783 B1 | 11/2001 | Kuntman et al. |
| 6,320,541 B1 | 11/2001 | Pozgay et al. |
| 6,337,656 B1 | 1/2002 | Natsume et al. |

* cited by examiner ent support under grant DAB763-98-C-0044 awarded by

METHOD AND DEVICE FOR PRECISE GEOLOCATION OF LOW-POWER, BROADBAND, AMPLITUDE-MODULATED SIGNALS

CLAIM OF PRIORITY

This invention claims priority to U.S. Provisional Application 60/279,114, filed Mar. 28, 2001, which is incorporated herein by reference in its entirety.

RIGHTS IN THE INVENTION

This invention was made, in part, United States Government support under grant DAB763-98-C-0044 awarded by the Department of Defense, via the Defense Advanced Research Projects Agency (DARPA). The United States Government has certain rights in the invention.

FIELD OF THE INVENTION

The present invention pertains generally to the processing of RF and/or microwave signals, and more particularly, to the detection and geolocation of the source of low-power, broadband, poorly-coherent amplitude-modulated RF signals.

BACKGROUND OF THE INVENTION

Detecting and geolocating sources of RF signals are vital requirements of intelligence, surveillance, and reconnaissance activities within the military and law enforcement communities. The present invention markedly improves the capability to sense and accurately locate low-power, broadband, amplitude-modulated RF or microwave signals having poor coherency.

SUMMARY OF THE INVENTION

The invention relates to methods and systems to detect low-power, broadband, amplitude-modulated signals. The signals may be RF or microwave. The invention also concerns methods and systems for analyzing such a detected signal in order to geolocate the source of the signal. By demodulating and analyzing the low frequency amplitude modulations (for example, in the 30 Hz–10,000 Hz range) which are superimposed on high frequency carrier signals (for example, in the 100 MHz–10 GHz), the present invention may reveal further information regarding the identification of the emitter type.

Systems for analyzing an amplitude-modulated signal are disclosed. According to one embodiment of the present invention, the system includes an antenna array, a RF subsystem, and a computational subsystem. The antenna array generates at least two antenna beams and an output signal for each of the at least two antenna beams. The RF subsystem processes the outputs for each of the at least two antenna beams and produces at least two channel outputs. The computational subsystem includes a detector that detects amplitude modulations that may be superimposed on the amplitude-modulated signal, an analog-to-digital converter that generates digital output data, and a digital signal processing unit that analyzes the digital output data to characterize a source of the amplitude-modulated signal.

Systems for analyzing an RF/microwave signal are disclosed. According to one embodiment of the present invention, the system includes an antenna assembly, a receiver, at least one crystal detector, an analog to digital converter, and a processor. The antenna assembly generates at least two antenna beams, each of the antenna beams generating an output signal. The receiver receives the output signals from the antenna assembly. The crystal detector detects amplitude modulations that may be present on the RF/microwave signal. The analog to digital converter converts the detected amplitude modulations to digital data. The processor processes the digital data to determine directional information for a source of the RF/microwave signal.

In another embodiment a single conversion receiver is used having a peak detector instead of a diode-detector TRF system.

A radio direction finder system for determining location information for a source of an RF/microwave signal is disclosed. According to one embodiment of the present invention, the radio direction finder system includes an antenna assembly, a first receiver, a second receiver, a first AM detector, a second AM detector, and a processor.

The antenna assembly generates a first and a second antenna beam, and the first and second antenna beams generating a first and second RF output signal, respectively. The first receiver receives the first RF output signal. The second receiver receives the second RF output signal. The first AM detector extracts amplitude variations from the first RF output signal and generates a first detected signal. The second AM detector extracts amplitude variations from the second RF output signal and generates a second detected signal. The processor determines directional information from the first and second detected signals.

A system for analyzing an RF/microwave signal is disclosed. According to one embodiment of the present invention, the system includes an antenna assembly, a receiver, at least one crystal detector, an analog to digital converter, and a processor.

The antenna assembly generates at least two antenna beams, each of the antenna beams generating an RF output signal. The receiver receives the RF output signals from the antenna assembly. The crystal detector detects amplitude modulations that may be present on the RF/microwave signal. The analog to digital converter converts the detected amplitude modulations to digital data. The processor processes the digital data to determine information about a source of the RF/microwave signal.

A method for characterizing a source of an RF signal having amplitude modulations is disclosed. According to one embodiment of the present invention, the method includes the steps of (1) receiving an RF signal; (2) filtering the RF signal; (3) amplifying the filtered signal; (4) detecting amplitude modulations from the filtered signal; (5) converting the amplitude modulations into digital data; and (6) processing the digital data to characterize a source of the RF signal.

A method for analyzing a source of an RF/microwave signal having amplitude modulations is disclosed, which method includes: providing a first antenna beam from a phased antenna array, the first antenna beam having a first beam width; providing a second antenna beam from a second phased antenna array, the second antenna beam having a second beam width and being offset from the first antenna beam by a squint angle, said first antenna beam overlapping at least partially with said second antenna beam; searching for an RF signal by manipulating the first and second beams; and detecting amplitude modulations from the RF signal; converting the amplitude modulations using an analog to digital converter to generate digital data; and analyzing the digital data to geolocate the source of the RF signal. The method may use diode detectors to detect the amplitude modulations.

A system for geolocating a source of an RF/microwave signal is also enclosed that involves the use of two detection systems. The first detection system includes: an antenna assembly that generates at least two antenna beams, each of said at least two antenna beams generating an output signal; a receiver for each of the at least two antenna beams to receive the output signals from the antenna assembly; at least one crystal detector for each output signal, each crystal detector detecting amplitude modulations that may be present on the RF signal; an analog to digital converter to convert the detected amplitude modulations to digital data; and a processor that processes the digital data to determine a first angular location of the source of the RF signal relative to the first detection system. The second detection system includes: an antenna assembly that generates at least two antenna beams, each of said at least two antenna beams generating an output signal; a receiver for each of the at least two antenna beams to receive the output signals from the antenna assembly; at least one crystal detector for each output signal, each crystal detector detecting amplitude modulations that may be present on the RF signal; an analog to digital converter to convert the detected amplitude modulations to digital data; and a processor that processes the digital data to determine a second angular location of the source of the RF signal relative to the second detection system. The first detection system is spaced apart from the second detection system such that the range of the source of the RF signal can be determined using the first angular location, the second angular location, the location of the first detection system, and the location of the second detection system.

A method for geolocating a source of an RF or microwave signal having amplitude modulations is disclosed, which method includes the use of two antenna assemblies. With reference to the first antenna assembly, the steps include: locating a first antenna assembly at a known location relative to a second antenna assembly; receiving the RF signal using the first antenna assembly and generating a first output signal; detecting amplitude modulations from the first output signal; converting the amplitude modulations into digital data; and processing the digital data to determine an angular location of the source of the RF signal relative to first antenna assembly. With reference to the second antenna assembly, the steps include: receiving the RF signal using the second antenna assembly and generating a second output signal; detecting amplitude modulations from the second output signal; converting the amplitude modulations into digital data; and processing the digital data to determine an angular location of the source of the RF signal relative to second antenna assembly. Thereafter, the range and location of the source of the RF signal can be determined using the first angular location, the second angular location, and the relative locations of the first antenna assembly and the second antenna assembly.

Also disclosed is a system for analyzing an RF/microwave signal, comprising an antenna assembly that generates at least one antenna beam and that generates a left RF output signal; an antenna assembly that generates at least one antenna beam and that generates a right RF output signal; a first RF splitter that splits the left RF output signal into a first component left RF signal and a second component left RF signal; a second RF splitter that splits the right RF output signal into a first component right RF signal and a second component right RF signal; a first RF phase shifter to shift the phase of the first component left RF signal; a second RF phase shifter to shift the phase of the second component right RF signal; a first RF combiner to combine the second component left RF signal with the phase-shifted second component right RF signal to create a second channel output; a second RF combiner to combine the first component right RF signal with the phase-shifted first component left RF signal to create a first channel output; a first receiver to receive the first channel output signal, wherein the first receiver comprises: at least one crystal detector to detect amplitude modulations that may be present on the first channel output signal; and an analog to digital converter to convert the detected amplitude modulations to first channel digital data; a second receiver to receive the second channel output signal, wherein the second receiver comprises: at least one crystal detector to detect amplitude modulations that may be present on the second channel output signal; and an analog to digital converter to convert the detected amplitude modulations to second channel digital data; and a digital signal processor that processes the first channel digital data and the second channel digital data to determine information about a source of the RF/microwave signal. In a desirable embodiment the digital signal processor utilizes FFT algorithms to analyze the first channel digital data and the second channel digital data to determine location information about a source of the RF/microwave signal. In yet another desirable embodiment the first phase shifter and the second phase shifter shift their input signals by approximately equal and opposite phase angles. Most desirably one phase shifter operate at +60 degrees and the other operates at −60 degrees.

DESCRIPTION OF THE INVENTION

Figure 1:
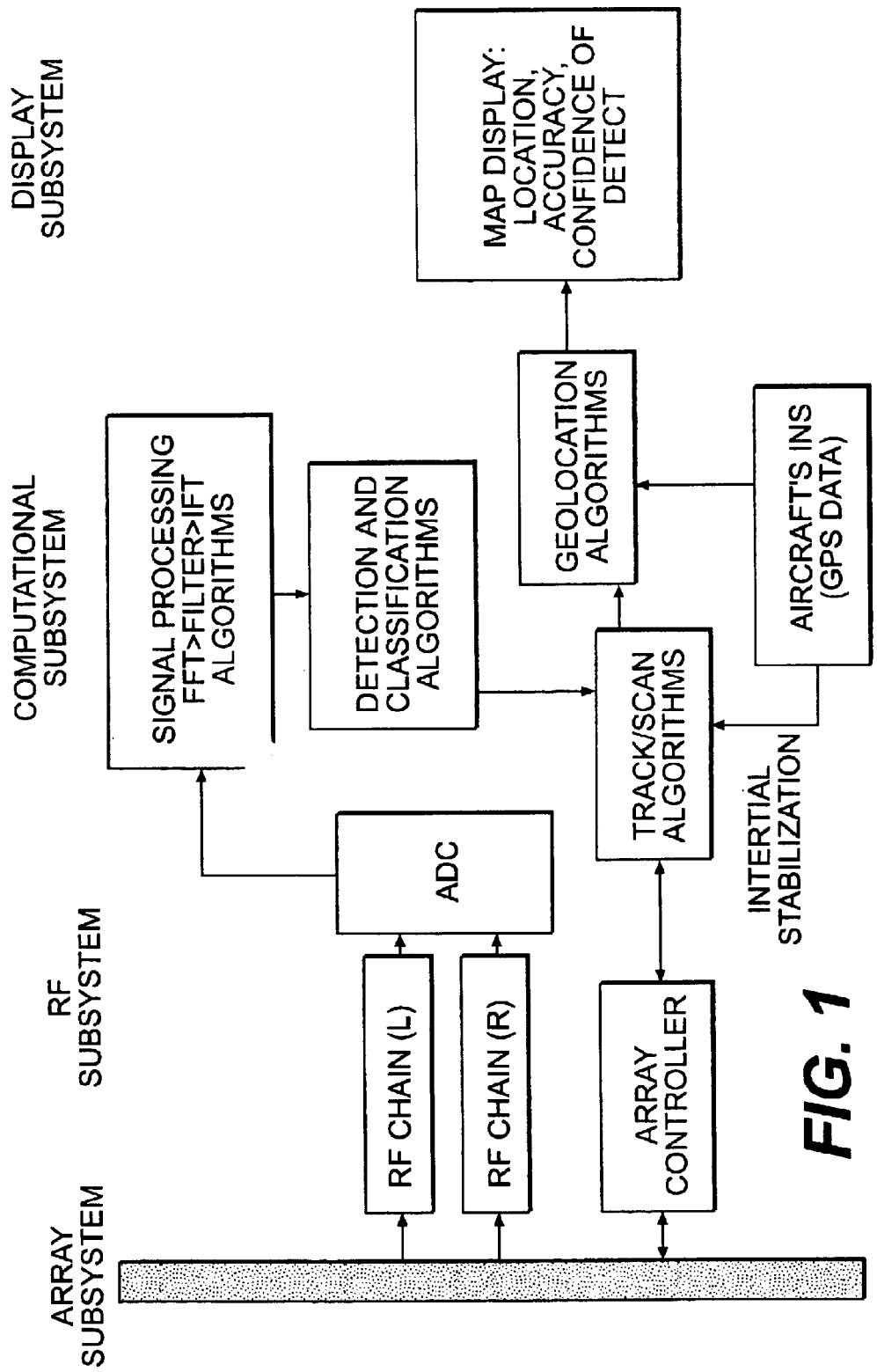
FIG. 1 A block diagram of one embodiment of the invention with four distinct subsystems: a phased array subsystem, a receiver subsystem, a computational subsystem, and an operator display subsystem.

Detecting and analyzing low-power, broadband, poorly-coherent amplitude-modulated RF or microwave signals is a difficult challenge. Multipath scattering, foliage attenuation and foliage scattering can make analysis especially difficult.

The present invention focuses on analyzing potential high frequency carrier signals generally in the 100 MHz to 10 GHz range, preferably in the 2 GHz to 4 GHz range, and more preferably at a frequency of about 2.5 GHz, and even more preferably at a frequency of about 2.4–2.5 GHz. Generally, the present invention demodulates low-frequency, amplitude modulations that are superimposed on the high frequency carrier signals, concentrating on signals that when demodulated have frequencies generally in the 20 Hz to 10 KHz range, and preferably in the 20 Hz to 240 Hz range, and more preferably at about the frequency of a likely AC source (e.g., 60 Hz in the U.S.A.).

A technical advantage of embodiments of the present invention is the provision of a system capable of detecting and geolocating low-power, broadband, poorly-coherent or incoherent amplitude-modulated RF or microwave signals by measuring the angle of arrival of the signal (bearing angle to source), as well as providing additional information relating to the source(s) of a detected signal through analysis of details of the amplitude modulation.

Another technical advantage of an embodiment of the present invention is that it may be used to combine a dual-channel receiver (heterodyne or tuned-RF) using crystal detection of the amplitude modulation envelope with an optimized high-gain phased-array antenna for increased signal power and precise signal arrival angle discrimination. Embodiments may also use fast Fourier transform ("FFT") post-detection processing to reduce noise. While the wide RF or IF signal bandwidth establishes a relatively high antenna thermal noise level at the output of the detectors, the FFT processing is capable of detecting signals having repetitive amplitude modulation (such as a pulse train) by looking for the harmonics of the pulse repetition frequency ("PRF") with a small effective post-detection bandwidth, such that the overall noise equivalent bandwidth ("NEBW") of the receiver can be quite good (i.e., on the order of kHz instead of MHz). This low NEBW, in combination with the high gain of the phased antenna array allows the realization of very good signal-to-noise ratio ("SNR") values, even with low amplitude signals at long ranges or under difficult signal propagation conditions. The optimized phased array design simultaneously generates two beams (termed right, R, and left, L, beams) having at a narrow "squint" angle to each other. By performing a normalized (R−L)/(R+L) comparison of the signal amplitudes in these two beams, a very precise measure of the angle of arrival of the signal may be obtained from which the source geolocation may be obtained.

Another technical advantage of embodiments of the invention is alleviation of an incoherency problem, through use of one or more crystal detectors.

Another technical advantage of embodiments of the invention is alleviation of the broad-band noise problem through the use of FFT digital post processing.

Another technical advantage of embodiments is the ability to reach a very high degree of angular accuracy for geolocation. In one embodiment, the present invention achieves an angular accuracy of about 0.1 to 0.5 degrees. This accuracy includes consideration for dynamic factors, such as vibration of the airborne platform. The present invention can achieve high accuracy geolocation using a phased array to create 2 high-gain steerable beams that geolocate via an angle of arrival technique. Unlike a typical monopulse approach, the geolocation is achieved without reliance on phase information.

Another technical advantage of embodiments of the invention is the ability to be configured to achieve a hardy robustness in the detection subsystem architecture. An embodiment of the invention uses an analog diode detector to process high frequency signals (0.01–10 GHz), and digitizes only the low frequency modulations (generally audible or near audible frequencies, and preferably less than about 10 KHz). The present invention is able to achieve a high degree of sensitivity with minimal computations while simultaneously reducing the system's complexity and size.

According to one embodiment of the present invention, the system combines the elements of a phased antenna array capable of providing both high gain and accurate angle of arrival (source bearing) information through accurate measurement of the relative signal levels between two adjacent antenna beams ($R_{beam}$ and $L_{beam}$) with an optimized dual-channel crystal-detector receiver and FFT digital post processing for high SNR operation. For this embodiment, a simple crystal-detector receiver configuration may be used to avoid the extreme processing demands that would be required by a digital receiver capable of handling the poorly-coherent, wideband (of the order of $BW_{rf}$=75 MHz bandwidths) microwave signals of interest. Not only would the cost of such an all-digital approach be excessive, but the size, weight, electrical power, and cooling requirements of such a digital receiver approach would be incompatible with constraints of some of the airborne platforms of interest. For that reason, this embodiment uses a dual-channel analog receiver (TRF or heterodyne) with crystal detector outputs, thereby reducing the signal bandwidth presented to the digital processor at its output by a factor of about 100,000 (e.g., from the $BW_{rf}$=75 MHz RF bandwidth to a post-detection FFT bandwidth of 500 Hz to 1 KHz).

Information regarding each of the components of a system is provided below:

Dual-Beam Phased Antenna Array

Figure 2A:
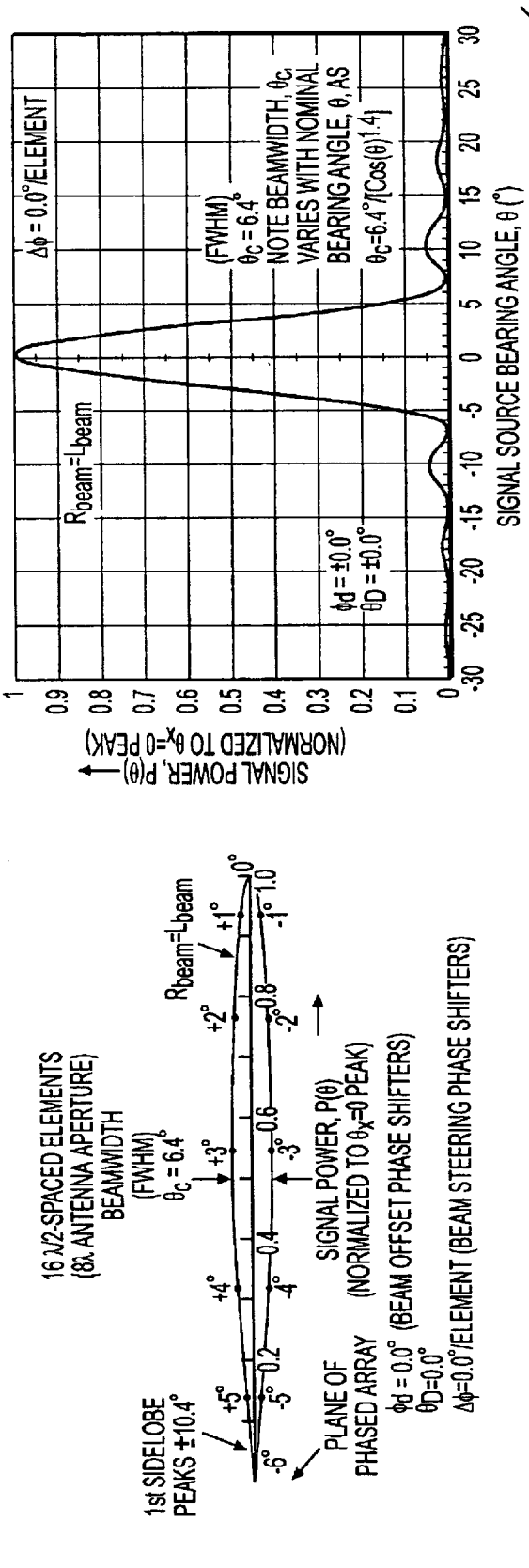
FIG. 2 An antenna pattern that may be generated using 16 elements (A), and two adjacent antenna beams that may also be generated (B) (C).
Figure 2B:
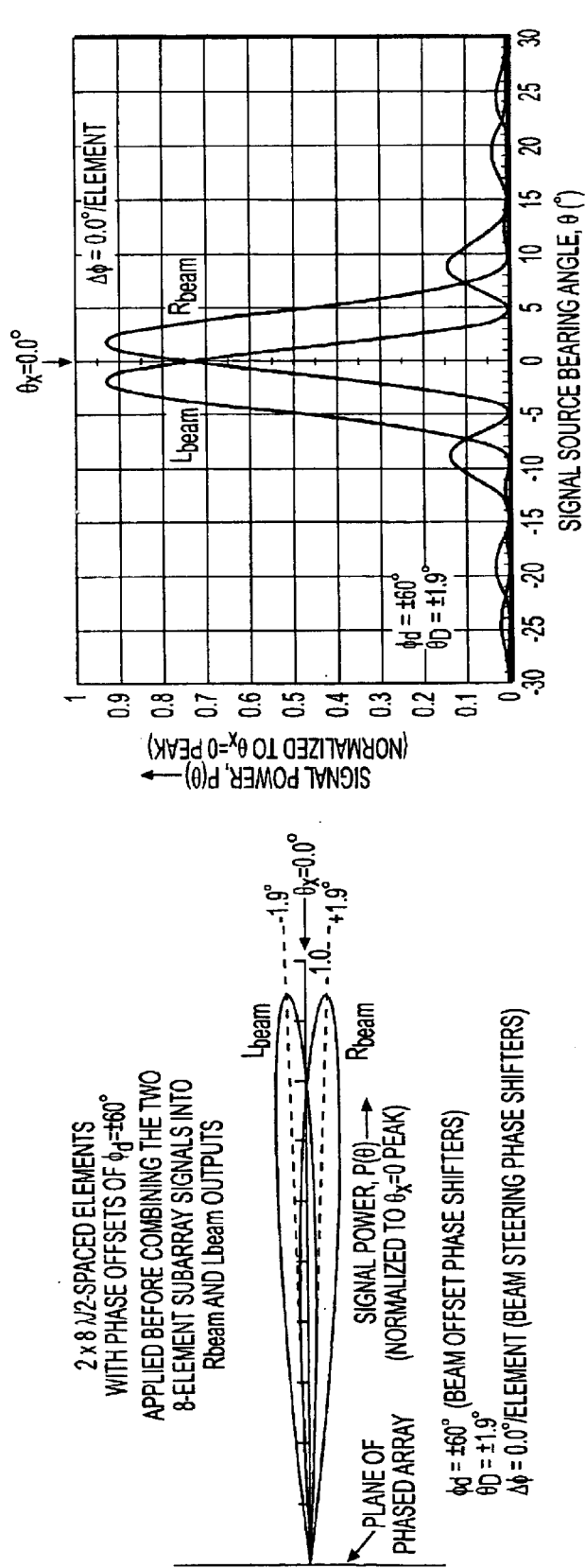
Figure 2C:
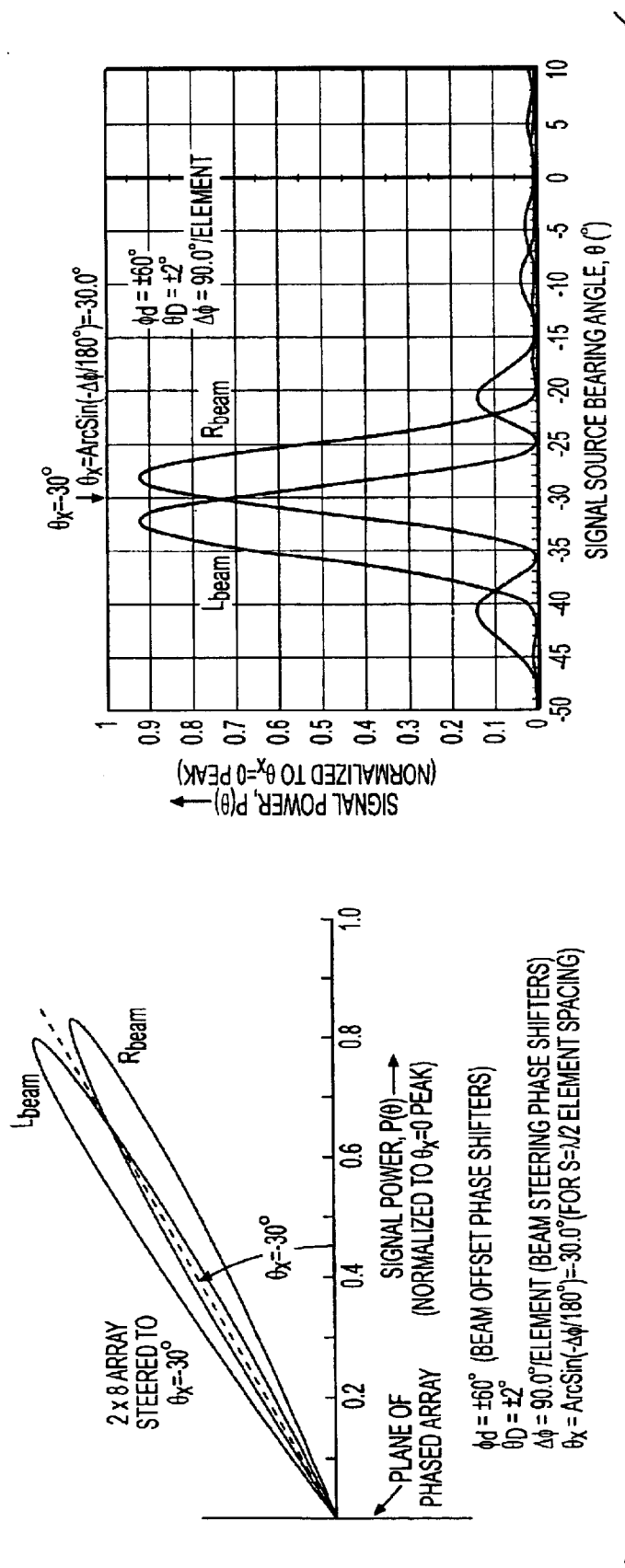

The ability of embodiments of the radio direction finder (RDF) system of the present invention to precisely determine the source bearing angle is dependent on the antenna, both because of the gain, $G_r$, it can provide (which directly increases the SNR), and the angular resolution of its beams, $\theta_c$, which dictate the precision of a given bearing angle measurement at a given SNR. As illustrated in FIG. 2A, $\theta_c$ is the full width at half maximum power [FWHM] angular beamwidth of the antenna array.) For the "front-end" of this RDF system, a phased antenna array approach that offers both high gain (20 dBi) for higher SNRs, and very precise angular resolution for more accurate geolocation at a given SNR, was developed. The phased array may be configured to provide simultaneous $R_{beam}$ and $L_{beam}$ outputs representing two beams displaced from a center crossover bearing angle ($\theta_x$) by equal and opposite bearing angles, $\theta_D$, (i.e., the $R_{beam}$ is centered at $\theta_x+\theta_D$, and the $L_{beam}$ is centered at $\theta_x-\theta_D$). In the case illustrated in FIG. 2B, $\theta_x$=0° and $\theta_D$=1.9°. FIG. 2C shows the beam pair steered to $\theta_x$=−30° while $\theta_D$=±1.9°.

Figure 3:
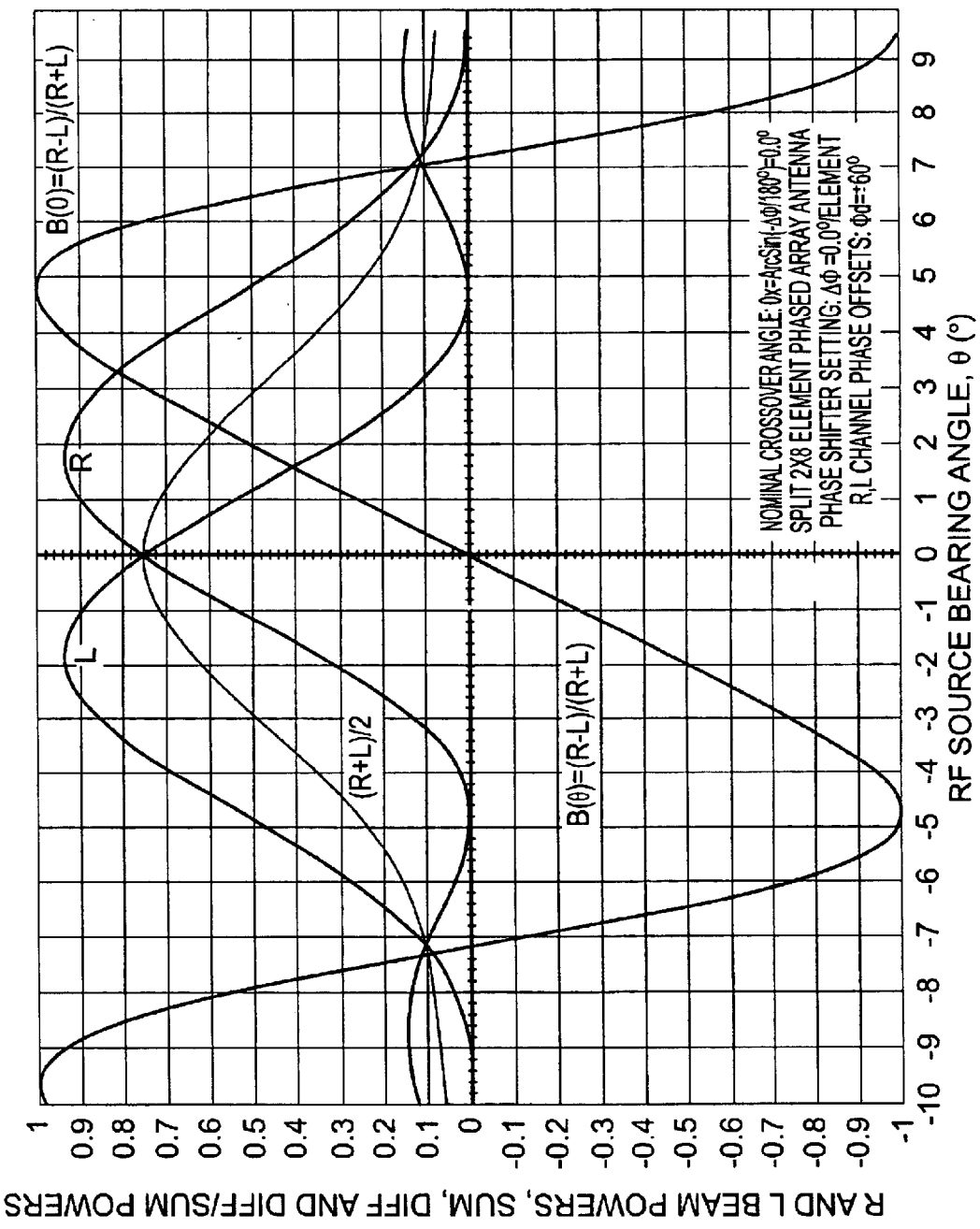
FIG. 3 Normalized error curve for a 16 element phased antenna array.

In a preferred embodiment, the $R_{beam}$ and $L_{beam}$ phased array outputs may be switched rapidly between the two receiver channels in order to equalize the effect in minor gain differences between the receiver channels. In this way, the R and L receiver output signals after processing are used to provide an extremely accurate measure of the difference between the source bearing, $\theta$, and the crossover angle, $\theta_x$, as follows:

$$-\theta_x = F_\theta[(R-L)/(R+L)] \qquad \text{Eq. 1}$$

where both the bearing error extraction function, $F_\theta[(R-L)/(R+L)]$, and the crossover angle, $\theta_x$, are precisely known from the phased array calibration data. The bearing error extraction function, $F_\theta[(R-L)/(R+L)]$, is simply the inverse of the $B(\theta-\theta_x)=(R-L)/(R+L)$ normalized error curve as obtained from the calibration data for the phased array. FIG. 3 shows an example of the $B(\theta-\theta_x)=(R-L)/(R+L)$ normalized error curve calculated for the case of a 16-element phased array with S=λ/2 spacing at $\theta_x$=0° and $\theta_D$=±1.9°. For this example, the "S-shaped" $B(\theta-\theta_x)=(R-L)/(R+L)$ normalized error curve goes from a value of −1 at $\theta-\theta_x$=−0.75$\theta_c$=−4.8° to a value of +1 at $\theta-\theta_x$=+0.75$\theta_c$=+4.8°. This means, of course, that the bearing error extraction function, $F_\theta[(R-L)/(R+L)]$, is defined only over the range of −1≤(R−L)/(R+L)≤1. In fact, $F_\theta$ is multi-valued, and the magnitudes of the R and L signals themselves get small, making the (R−L)/(R+L) quantity very noisy, for bearing angles, θ, outside of the Max Bearing Angle Extractability Range:

$$\theta_x - 0.75\theta_c \leq \theta \leq \theta_x + 0.75\theta_c \text{ Max Bearing Angle Extractability Range}$$

Because the B(θ−θ$_x$)=(R−L)/(R+L) function in FIG. 3 gets "flat" near the extreme ends of this range (i.e., B(θ) changes little from about θ=4° to about 4.8° or from about θ=−4.8° to about −4°), a more practical bearing angle extraction range for case shown would be:

$$\theta_x - 0.50\theta_c \leq \theta \leq \theta_x + 0.50\theta_c \text{ Practical Bearing Angle Extractability Range} \quad \text{Eq. 3}$$

or θ$_x$−3.2°≤θ≤θ$_x$+3.2° for this example. In the phased array design of the present invention, this range may be adjusted somewhat by varying the offset phase shifter values (Φ$_d$ values), from the Φ$_d$±60° values shown in FIGS. 2B, 2C and 3; the Φ$_d$±60° values, however, produce an excellent compromise giving good linearity of the B(θ−θ$_x$) curve and good SNR (which tends to go as the reciprocal of the (R+L) curve in FIG. 3) over the practical extraction range. Hence, the SNR is good where the B(θ−θ$_x$) curve is linear.

This precise bearing information gained using this embodiment can be used to provide precise geolocation of a fixed source from a movable (e.g., aircraft) platform by various means. For example, monitoring the changing source bearing angle as seen from a moving platform with a side-looking phased array system of the present invention can provide, given a suitably accurate platform location, elevation and orientation information, and accurate geolocation of the source using conventional triangulation means. Alternatively, from an aircraft platform, a pair of perpendicular down-looking phased array systems of the present invention may be utilized to provide geolocation of a source below from single longitudinal and transverse bearing angle measurements from the two arrays given the elevation of the aircraft platform above the source (and, of course, platform location and orientation).

Implementation of Dual-Beam Phased Antenna Array

Figure 4:
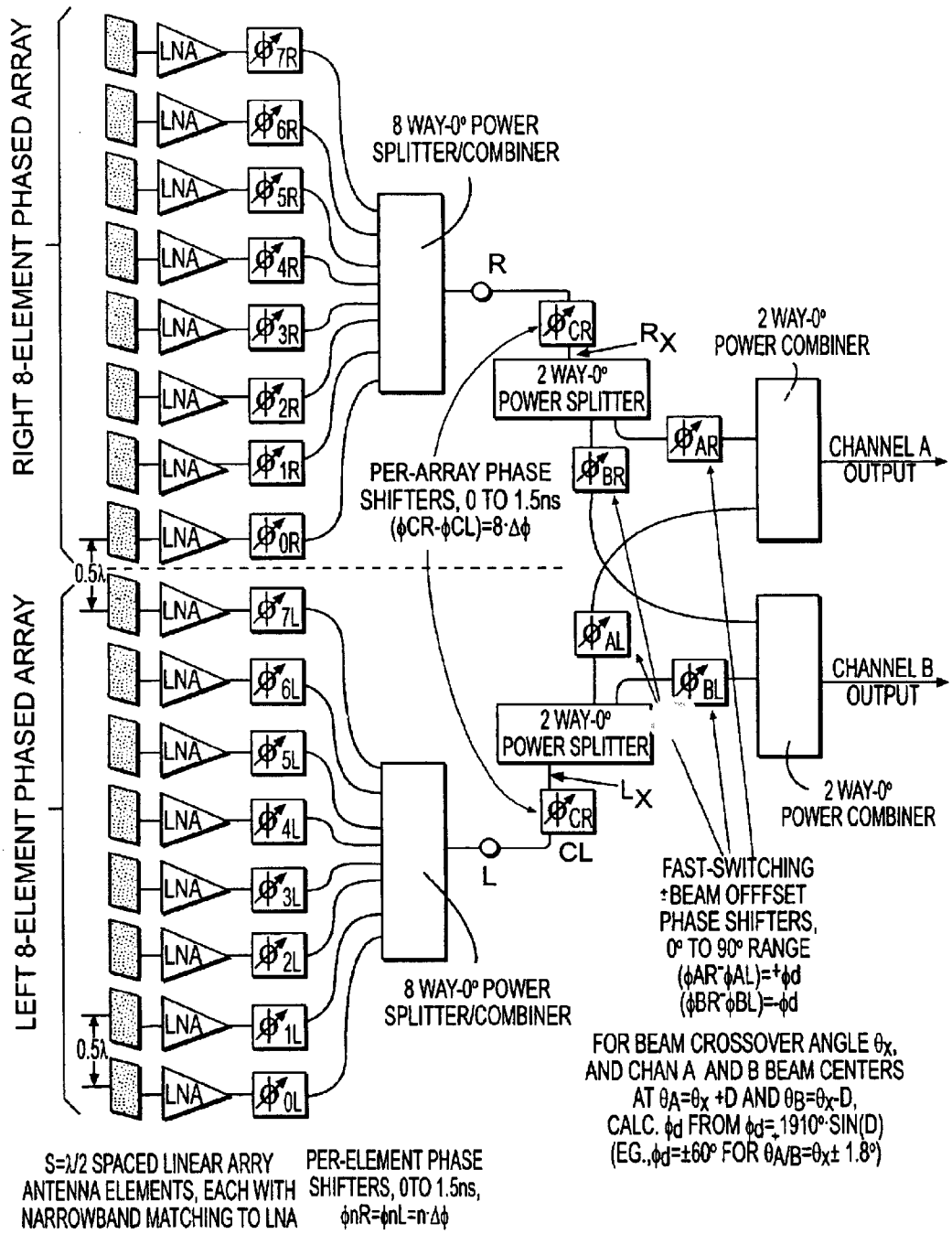
FIG. 4 A phased array subsystem and an RF receiver subsystem for an embodiment of the invention.

FIG. 4 illustrates one embodiment of an implementation of the dual-beam phased antenna array described above with functionality of the type illustrated in FIGS. 2A–2C and 3. The key to the creation of the simultaneous R$_{beam}$ and L$_{beam}$ outputs is to break the array into two halves, interferometrically combining the outputs of the two halves with deliberate phase offset values (departures from the nominal subarray phase difference) applied to create the R$_{beam}$ and L$_{beam}$ outputs. The case illustrated is a 16-element linear array with λ/2 element pitch (center-to-center spacing of one half wavelength), sectioned into two 8-element subarrays. At the risk of some confusion (because they have nothing to do with the two beams, the R$_{beam}$ and the L$_{beam}$) the 8 elements to the left of the centerline will be referred to as the left subarray and the 8 elements to the right of the centerline will be referred to as the right subarray. These two identical subarrays may be constructed using standard phased array approaches known to those skilled in the art. Behind each of the elements is a low-noise amplifier (LNA) and a phase shifter. Optionally, filters (not shown) between the elements and their respective LNA's may be utilized as needed. Because of the desire for very high precision RDF over substantial bandwidths for signals whose precise frequency is unknown, it is preferable to have all of the variable "phase shifters" used in the antenna be "true variable time delay" elements with adequate time delay range to compensate for all of the time delay difference seen in arrival time across the array due to signals arriving at large bearing angles, θ. For convenience, these variable time delay elements will be referred to as "phase shifters" and their time delay values, td, will be expressed as degrees of phase shift, ΔΦ (where ΔΦ=360° corresponds to a time delay equal to one period of the nominal signal frequency, f$_{sig}$; i.e., t$_d$=(ΔΦ/360°)/f$_{sig}$).

The operation of the dual-beam phased antenna array of FIG. 4 can best be understood by first considering how it would be used as a conventional 16-element single-beam antenna. To receive a signal from a source bearing angle, θ, off of the normal to the axis of the linear array, the phase difference, ΔΦ, between adjacent elements within the 8-element subarrays with element spacing S=λ/2 is set to a value of:

$$\Delta\Phi(S/\lambda)(360°)\text{Sin}(\theta)=(180°)\text{Sin}(\theta) \text{ for } S=\lambda/2 \quad \text{Eq. 4}$$

Since the spacing between the centers of the two 8-element subarrays is 8S=4λ, in order to combine the two 8-element subarray signals into a 16-element beam we need to apply a phase shift is applied between subarrays, of:

$$\Phi_C = (8S/\lambda)(360°)\text{Sin}(\theta) = (1440°)\text{Sin}(\theta) \quad \text{Eq. 5}$$

(The polarity of Φ$_C$ is taken as if the delay were inserted into the output of the right 8-element subarray.) While the 8-element subarrays have a nominal half-power beamwidth (FWHM) of:

$$\theta_c = 13°/[\text{Cos}(\theta)]^{1.4} \text{ FWHM for 8-element subarrays,} \quad \text{Eq. 6}$$

when the proper Φ$_C$=1440°Sin(θ) phase correction is applied and the RF signals from the two subarrays are added in a 2:1 power combiner (e.g., Wilkinson power divider or other suitable hybrid coupler), the result is a full 16-element beam, centered at the same angle, θ, having a half-power beamwidth of:

$$\theta_C = 6.5°/[\text{Cos}(\theta)]^{1.4} \text{ FWHM for full 2×8 array with}$$
$$\Phi_C = 1440°\text{Sin}(\theta) \quad \text{Eq. 7}$$

This is simply the operation of a 16-element phased antenna array. To obtain the two "squinted" beams desired, the two 8-element subarray signals are split into two by use of 1:2 power dividers (e.g., Wilkinson). While this reduces the signal power levels by 3 dB, assuming there is adequate gain in the LNAs behind each antenna element, the noise figure (NF) or signal-to-noise ratio (SNR) will be unchanged by splitting the signals. If one of these split signals from each 8-element subarray is corrected with the proper Φ$_C$=1440°Sin(θ) phase correction and the two combined, the result will be the 16-element beam at angle θ of Eq. 7. If, however, the phase correction, Φ$_C$, is deliberately altered from its nominal Φ$_C$=1440°Sin(θ) value by some amount, Φ$_d$, that is:

$$\Phi_{CS}=\Phi_C+\Phi_d=(1440°)\text{Sin}(\theta)+\Phi_d \text{ applied between subarrays} \quad \text{Eq. 8}$$

the center position of the beam will be shifted. If the magnitude of Φ$_d$ is not too large (e.g., less than 90° or so), the beamwidth will be essentially the same as given in Eq. 7, but the center of the beam will be shifted from angle θ to angle θ+θ$_D$. The approximate combiner phase offset, Φ$_d$, required near θ=0 to produce an angular shift, θ$_D$, of the beam from θ to θ+θ$_D$ is given by:

$$\Phi_d=(1910°)\text{Sin}(\theta_D) \text{ required combiner phase offset} \quad \text{Eq. 9}$$

For example, if a beam shift of θ$_D$=+1.8° is desired (as for the R$_{beam}$ in FIG. 2 or 3), then a combiner phase offset of Φ$_d$=+60° will be required. Similarly, for θ$_D$=−1.8° for the $L_{beam}$, $\Phi_d=-60°$ will be required (a 60° phase delay in the signal path from the left subarray). In the dual-beam phased array, designed to put out simultaneous $R_{beam}$ and $L_{beam}$ signals, the two 8-element subarray signals are phase corrected with opposite offsets before combining them to form the two ("channel A" and "channel B" in FIG. 4) signal outputs. For example, for the case illustrated in FIG. 2B and FIG. 3 ($\theta_x=0°$ nominal beam pointing), all of the $\Delta\Phi$ phase shifters are set to 0°, as are the two $\Phi_C$ shifters (one on each subarray output). Hence, to achieve an $R_{beam}$ centered at +1.9° a $\Phi_d=60°$ phase shift is inserted between the right subarray output and the $R_{beam}$ output combiner (with no phase shift applied to the signal from the left subarray). Correspondingly, to produce an $L_{beam}$ centered at −1.9° a $\Phi_d=60°$ phase shift is inserted between the left subarray output and the $L_{beam}$ output combiner (with no phase shift applied to the signal from the right subarray).

For the example of FIG. 2C, where the nominal beam pointing is taken to be at $\theta_x=-30°$, from Eq. 4 we see that the per-element phase difference will be set at $\Delta\Phi=+90°$, and the nominal (single-beam) phase correction between subarrays would be (from Eq. 5) $\Phi_C=-720°$. Assuming it is desirable to keep the same $\Phi_{dR}=+60°$ and $\Phi_{dL}=-60°$ combiner phase offset values, these calculations follow:

$$\Phi_{CS}(R_{beam})=\Phi_C+\Phi_{dR}=-720°+(+60°)=-660° \text{ for } R_{beam} \text{ centered at } -28°$$ Eq. 9

$$\Phi_{CS}(L_{beam})=\Phi_C+\Phi_{dL}=-720°+(-60°)=-780° \text{ for } L_{beam} \text{ centered at } -32°$$

Note that in the phased array design of FIG. 4, the $R_{beam}$ or $L_{beam}$ signals can be placed on either the "channel A" or "channel B" outputs (or either one of them can be sent to both outputs, etc.) simply by changing the offset phase shifter settings in the two channels. By this means the $R_{beam}$ and $L_{beam}$ signals can be rapidly switched between the "channel A" and "channel B" receiver channels to avoid the gain offset errors discussed previously. In one embodiment, the nominal $\Phi_C=(1440°)\sin(\theta)$ phase shifters (only one of which is used at a time; that on the right 8-element subarray for positive, $\theta_x>0$, beam angles, and that on the left 8-element subarray for negative, $\theta_x<0$, beam angles) may be positioned in front of the 1:2 power splitters in order to avoid unnecessary duplication of their large delay range and fine step size (11.25° nominal step size in $\Phi_C$ versus a 45° step size in the $\Delta\Phi$ shifters).

Signal Bearing Angle Measurement Using Dual-Beam Phased Array System

In operation, an initial goal may be to locate a target signal source to within about a ±0.5$\theta_c$ range (e.g., by rapidly scanning until the target is found in one or two beams). At that point, the array is steered to the estimated target bearing (i.e., $\theta_x$ is set to the source bearing) and the magnitude of the R and L receiver outputs measured. The precise source bearing may be obtained from $\theta_x$ (known from the phased array phase shifter settings and the antenna calibration data) and the (R−L)/(R+L) value by using Eq. 1. In operation, as the source bearing angle varies (as from platform motion, for example), the phased array pointing ($\theta_x$ setting) may be adjusted to keep the difference between the measured source bearing and $\theta_x$ as small as possible (preferably within about ±1° to about ±2°, and more preferably within about ±0.5$\theta_c$ or about ±3.2° for the example shown in FIGS. 2 and 3). For example, for the case shown in FIG. 2C, where the array is pointed to $\theta_x=-30°$, if the normalized error of (R−L)/(R+L)=−0.500 value is measured, by reference to the B($\theta$) curve in FIG. 3, the value of ($\theta-\theta_x$)=−1.9816° is known, and so the precise target source bearing angle must be $\theta=-31.9816°$.

Hence the measurement of (R−L)/(R+L) provides a direct measure of the source bearing angle (angle of arrival of the signal), $\theta$, with accuracy insured by channel-swapping gain equalization and high precision (low random data scatter) realized by the achievement of high SNR values.

Crystal-Detector TRF Receiver

Because low-power, broadband, incoherent RF signals are difficult to detect by their very nature, embodiments of the invention generally use a sensitive receiver subsystem. The present invention may utilize any number of receiver subsystems. In one embodiment, a complex heterodyne receiver configuration may be used.

In a preferred embodiment, a relatively simple tuned RF (TRF) receiver configuration may be used. Such a TRF receiver has been demonstrated to give excellent performance in this application. A simple crystal-detector receiver configuration, for example, has the advantage that it avoids the extreme processing demands that would be required by a digital receiver capable of handling the poorly-coherent, wideband (of the order of $BW_{rf}=75$ MHz bandwidths) microwave signals of interest. By comparison, an all digital approach generally may be excessively expensive. Moreover, the size, weight, electrical power and cooling requirements of an all digital receiver approach would likely be incompatible with the constraints of many airborne platforms of interest. For these reasons, the alternative of a dual-channel analog receiver (TRF or heterodyne), with crystal detector outputs, offers significant advantages. For example the signal bandwidth presented that is presented to the digital processor is reduced by a factor of about 100,000 (ie., reduced from a $BW_{rf}=75$ MHz to a post-detection FFT bandwidth of 500 Hz to 1 KHz).

In one embodiment of a TRF receiver, the RF signal and noise bandwidth definition is provided by a bandpass filter (BPF) near the input (typically augmented by an additional BPF later in the gain chain). All of the signal gain (e.g., ~85 dB for a $BW_{rf}$75 MHz bandwidth) necessary to amplify the weak signals at the antenna elements to the levels required to obtain sensitive square-law operation of the crystal detector is provided at the RF signal frequency itself. In the dual-channel receiver, the outputs of the zero-bias (e.g., planar doped barrier) crystal detectors are baseband voltages that are essentially proportional to the $R_{beam}$ and $L_{beam}$ signal powers levels out of the phased antenna array. Because semiconductor crystal detectors have a limited range of signal power over which they closely approximate the desired square-law behavior, two detector outputs are provided at different points in the gain chain (e.g., at 65 dB and 85 dB gain points). In this way, if the signal amplitude is so large that the crystal detectors seeing the full 85 dB gain goes into its saturation region, the outputs from the detectors seeing only 65 dB of gain can be used for the digital signal processing.

Post-Detection FFT Digital Signal Processing

While an analog crystal receiver approach offers the advantages of completely covering the signal bandwidth with a very low power, low cost, lightweight, compact receiver, it has relatively high noise levels at the crystal detector outputs due to the wide RF or IF signal bandwidth, which would tend to degrade SNR to reduce signal detectability and geolocation accuracy. This difficulty is alleviated in an embodiment of the invention by combining the crystal receiver channels with high-performance "front-end" (antenna) and "tail end" (DSP) elements capable of obtaining both sensitive detection and precise geolocation with these wideband crystal receiver channels. The "tail end" digital signal processing approach identified is based on the use of FFT processing that can detect the repetitive pulse modulation (with pulse repetition frequencies in the low audio range) of the signals while allowing only minimal noise from the detector outputs to pass through (e.g., 0.1 Hz to 1 Hz equivalent video bandwidth). Before going to the analog-to-digital converters (ADCs), the crystal detector outputs may be filtered through baseband low-pass analog filters (e.g., active filters) having a nominal cutoff frequency of half of the ADC sampling rate and Bessel response characteristics (Gaussian-shaped to avoid overshoot). Further digital low-pass filtering (such as simple averaging of groups of points) may be used to obtain the sample set on which FFT processing is to be performed.

Sample sorting to place all of the $R_{beam}$ related ADC data points in one FFT sample set (from which the R signal amplitude will be determined) and all of the $L_{beam}$ related ADC data points in the other FFT sample set (from which the L signal amplitude will be determined) may also take place at this point. In more complex, beam-hopping operating modes, the ADC data points are sorted into additional pairs of $R_{beam}$ and $L_{beam}$ sample sets and additional pairs of FFT digital processing operations performed to obtain the R and L values for each of the beam pairs. Because the pulse repetition frequency (PRF) of the amplitude modulation on the signals of interest is relatively constant, the FFT provides a large processing gain to the SNR. Assuming the amplitude modulation PRF lies in a single FFT frequency bin, the effective post-detection "video" bandwidth will simply equal the reciprocal of the total duration of the FFT (e.g., 1.0 Hz for a 1 second FFT, or 0.1 Hz for a 10 second FFT). This processing gain raises the voltage signal-to-noise ratio (SNR) in the R and L FFT output. If the SNR of the R+L signal exceeds 3:1 (preferably 5:1 or more), then the (R−L)/(R+L) arithmetic needed to precisely obtain the source bearing angle, θ, from Eq. 1 may be performed with acceptable accuracy.

The invention will now be described in detail with reference to the FIGS. 1 and 4–6, with like reference numbers being used for like parts.

FIG. 1 presents a system architecture for one embodiment of the present invention. The system 100 includes four subsystems: an array subsystem 110; an RF subsystem 140; a computational subsystem 170; and a display subsystem 190. Array subsystem 110 creates at least two antenna beams which are used to receive RF and/or microwave signals, thereby generating at least two RF outputs. The at least two RF outputs are then processed by RF subsystem 140, which generates at least one output signal, which in turn is processed by computational subsystem 170. Computational subsystem 170 uses digital signal processing, including FFT algorithms, to detect and classify RF signals. Display subsystem 190 then presents the results of the attempts to detect and classify the RF signals, and may, where appropriate, provide the location and other relevant information regarding the source of a RF signal.

FIG. 4 illustrates an array subsystem 110 and an RF subsystem 140 according to a preferred embodiment of the invention. In the embodiment shown in FIG. 4, array subsystem 110 comprises a 16-element phased antenna array, which is configured to operate as two abutted 8-element phased antenna arrays, which may be referred to as the left 8 element phased antenna array and the right 8 element phased antenna array. (Each of the 16 depicted elements may be referred to as element 111.) The two 8-element phased antenna arrays can be operated to simultaneously provide two outputs representing two adjacent antenna beams with a small angular separation (called the squint angle) between them. As generally described above, the two adjacent antenna beams can be used to scan a target space for potential RF signals. More particularly, the pair of beams can be nearly continuously varied in azimuth over a typical angular range of −56°<θ<56° to search for an RF source. The squint angle between the beams may also be varied, if desired. Typical values for squint angles are about D=±2° (measured from the amplitude crossover point between the two beams, $θ_x$) in a precision tracking mode, opening to about D=±3.2° in a search mode. These values are for an antenna beam width of $θ_c$=6.4° in azimuth (or more precisely, $θ_c$=6.4°/Cos(θ), due to the 1/Cos(θ) reduction of resolution with beam angle (measured from normal to array), typical for a 16-element array with λ/2 element spacing). (Experience with phased array configurations, including inter-element coupling effects, suggests that $θ_c$=6.5°/(Cos(θ))$^{1.4}$ may be a more accurate measure of FWHM beamwidth. Of course, the $G_r$=20 dBi broadside (θ=0°) antenna gain will also fall off as (Cos(θ))$^{1.4}$).

As shown, the embodiment of FIG. 4 utilizes a separate Low Noise Amplifier ("LNA") directly at each array element. If desired, bandpass filters (e.g., low cost, ceramic filters) (not depicted in FIG. 2) may be used at each element and on the front end of the LNA 115 to reduce any undesired effects that might otherwise be caused by strong, out of band signals, though certainly such usage would introduce a small insertion loss and, thus, increase the noise figure slightly. The use of a separate LNA 115 at each array element 111, however, permits the operation of the array to achieve two simultaneous antenna beams without suffering power splitting losses that might otherwise be experienced. Preferably, each of elements 111 is narrowband matched to LNA 115.

Preferably, the LNA gains are sufficient to overcome any phase shifter, power combiner and splitter losses without degradation of noise figure, even though fairly large numbers of true time delay shifter stages may be required to achieve the precision in beam pointing desired (large numbers of beams). In a preferred embodiment of FIG. 4, an LNA gain of at least about 15 dB was deemed sufficient.

On the other hand, the gains of the per-element LNAs should not be so large as to result in substantial gain drifts (which would compromise radio direction finding or "RDF" accuracy). Note that large gains may be necessary in the receiver between the antenna inputs and the crystal detectors, but any significant imbalance between these large gains in the two channels may result in degradation of RDF accuracy. In one embodiment of the present invention, this undesired degradation may be minimized without sacrificing performance by the rapidly switching (swapping) the two antenna beams between the two receiver channels. This technique avoids the need for additional hardware, as it can be accomplished by simply switching the setting of the phase shifters in the phased-array antenna, and synchronously switching the A/D converter ("ADC") outputs between channels in the digital filtering process.

Again referring to FIG. 4, the output of each LNA 115 is delivered to the input of a phase shifter 121. Hence, identical 8-element linear phased arrays are abutted (preserving 0.5 λ element spacing) with identical phase shifter settings for beams centered in desired crossover point direction $θ_x$. An 8 way power splitter/combiner is used to combine the inputs from the eight phase shifters 121. In a preferred embodiment, an 8 way low-loss, low-VSWR power splitter/combiner may be used such that none of the inputted signals will experience any phase shift while passing through the combiner and all of the signals will be added in phase. Accordingly, two 8-way power combiners are used to create a "right" RF signal and a "left" RF signal, generally representative of the signals generated from the right antenna beam and the left antenna beam.

As illustrated in FIG. 4, the right RF signal and the left RF signal are each submitted to a per-array phase shifter 127. Preferably, all phase shifters may be implemented with true variable time delay elements for frequency-independent accuracy. The output of each per-array phase 127 shifter may then delivered to a 2-way power-splitter 129, which creates an "A" channel signal and a "B" channel signal for each of the right and left RF signals. Hence, the right RF signal is divided into an A channel RF signal ("AR") and a B channel RF signal ("BR"). Similarly, the left RF signal is divided into an A channel RF signal ("AL") and a B channel RF signal ("BL"). The two A channels are then combined using a 2 way power combiner 131 to produce a channel A output (i.e., AL+AR are combined), and the two B channels are then combined using a 2 way power combiner 131 to produce a channel B output (i.e., BL+BR are combined).

While FIG. 4 discloses the use of multiple phase shifters, it is possible to utilize the teachings of the present invention by eliminating one or more of the phase shifters. It is preferable to have at least one phase shifter in at least one arm. It is also preferable to have at least two phase shifters when trying to detect targets significantly off-center. It is preferred that the degree of shift for phase shifter "AL" and the degree of shift for phase shifter "BR" be equal and opposite, for example, ±60 degrees.

Figure 5A:
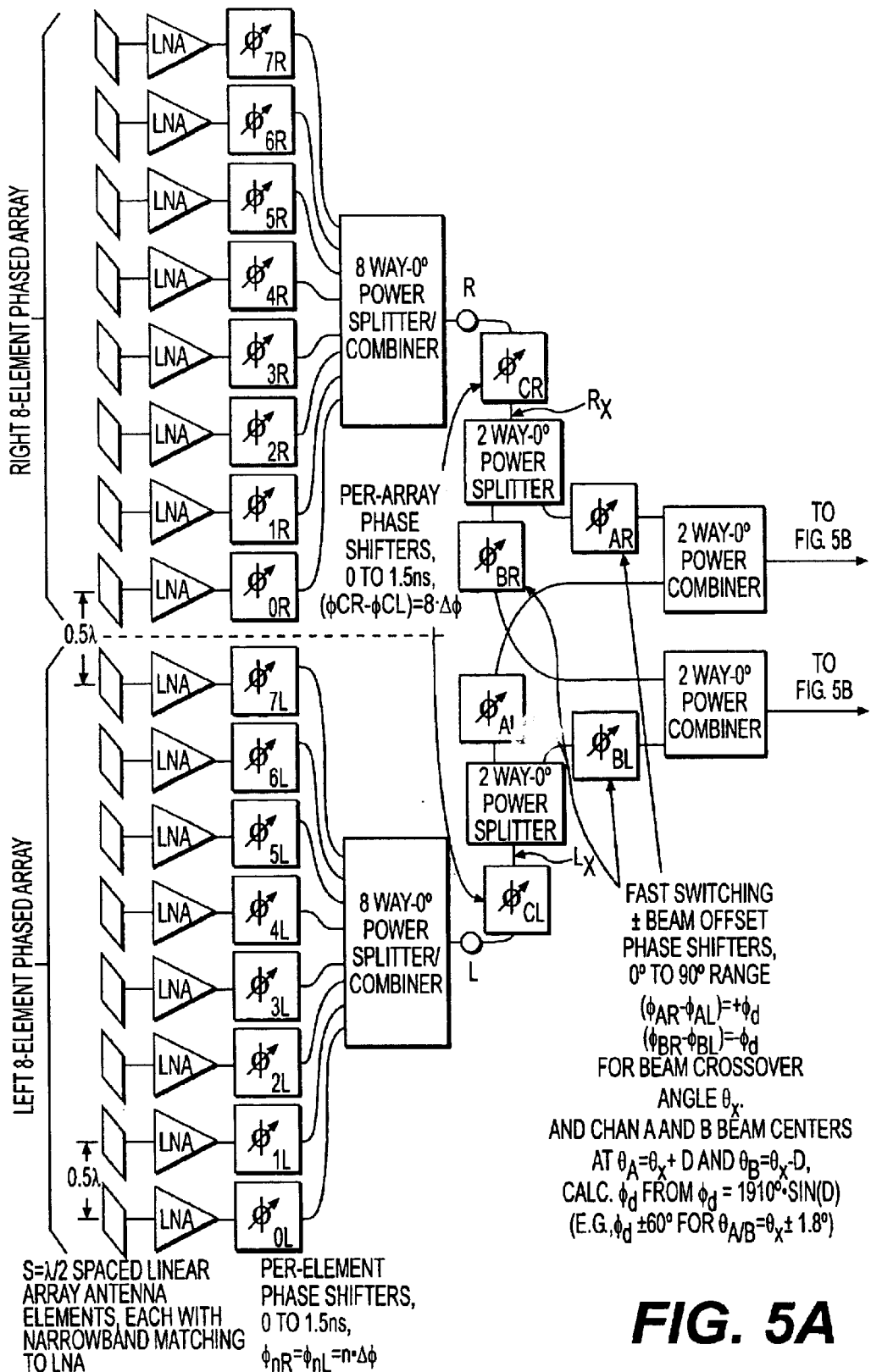
FIG. 5 A phased array approach for the embodiment of FIG. 2.
Figure 5B:
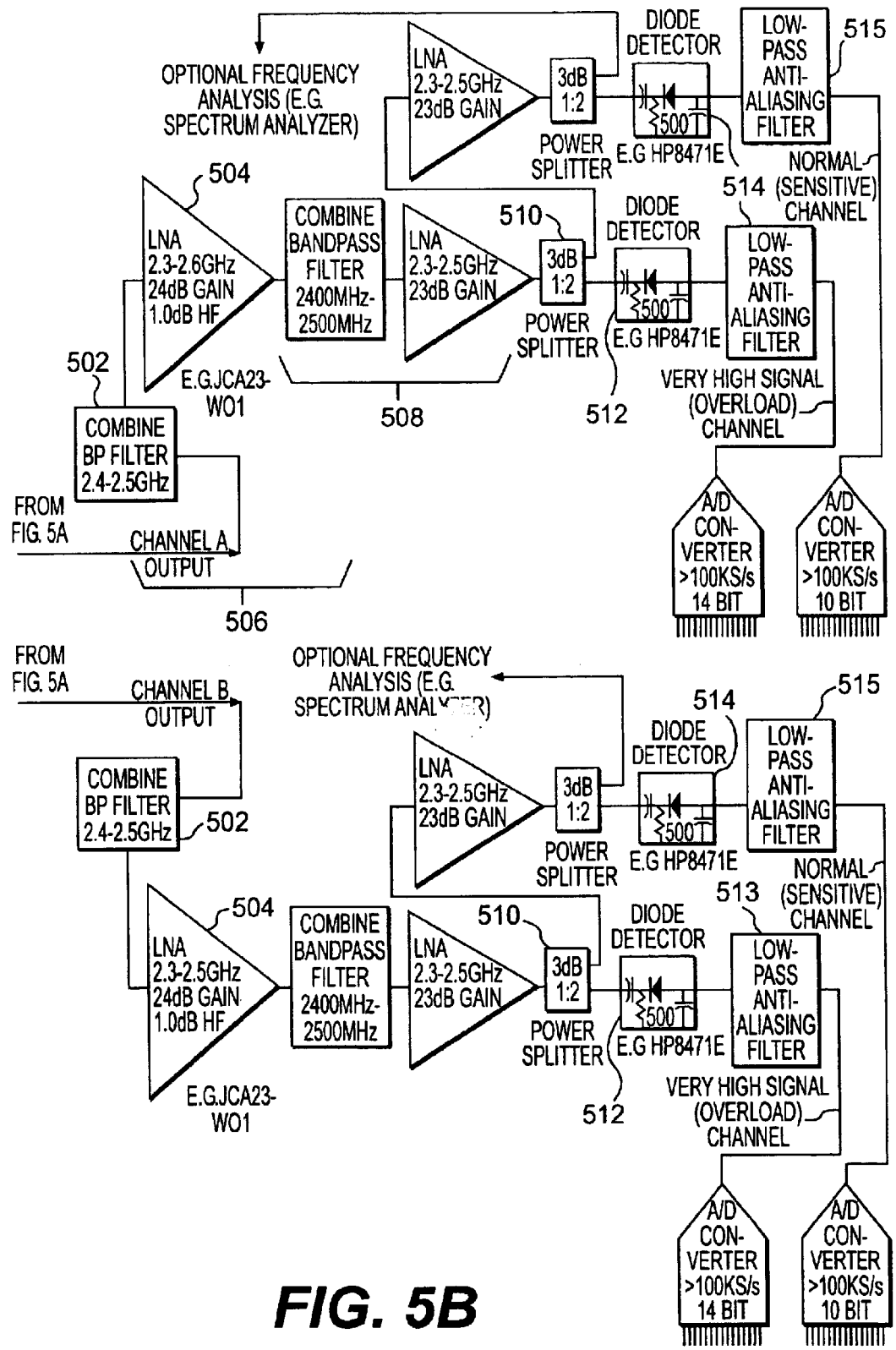

FIG. 5 illustrates the array subsystem 110 as depicted in FIG. 4, and shows how it is connected to an RF subsystem 140 according to a preferred embodiment of the invention.

In one embodiment, the receiver behind the phased antenna array may be a dual channel receiver with the same 75 MHz (typical) bandwidth in each channel (e.g., defined by identical cavity or "comb" filters in each RF path) with a crystal detector output into an A/D converter. The crystal detector may be modeled as an ideal square-law detector. The receiver channels may be either simple TRF or single-conversion superheterodyne designs; the performance modeling is unchanged. It is assumed that the RF gain is sufficient to raise the antenna RF thermal noise level into the detector to the point where the detector noise output dominates over other noise sources such as ADC quantization noise, etc. To extend the dynamic range in very high signal level cases, an additional crystal detector may be added at a lower RF gain point on each channel (resulting in the use of at least 4 crystal detectors for the two channels). Optimal low-pass filtering of the detector output may be desired, so that the video bandwidth or video integration time characterizing measurements on this detector output have optimized signal-to-noise ratio. This may be easily realized in practice with a proper combination of low-pass analog filtering between the crystal detectors and the ADCs, over-sampling in the ADCs to support channel switching without penalty, digital filtering after the ADCs for bandwidth reduction prior to FFT analysis, and then optimized FFT analysis to take full advantage of the nominal PRF amplitude modulation on the signals of interest.

As shown in FIG. 5, each of the channel A output and the channel B output are delivered to a band pass filter 502 to filter out undesired signals. Preferably, the bandpass filter 502 is centered about the RF or microwave frequency of interest. For example, for a system directed to 2.45 GHz, a preferred band pass filter has a band pass of 2.4–2.5 GHz. Each of the filtered signals may then be delivered to a low noise amplifier (LNA) 504 which is designed to provide significant gain for the RF or microwave frequency of interest. For example, for a system directed to 2.45 GHz, a LNA should provide a gain preferably of at least 65 dB at 2.45 GHz, and more preferably of at least 85 dB. Currently, such high gains are likely to be achieved using a series of BPF/LNA combinations. As shown in FIG. 5, the high gain is accomplished using two BPF/LNA combinations 506/508.

As shown in FIG. 5, each of the outputs from the high gain BPF/LNA combinations 506/508 are then split using a power splitter 510, thereby creating two RF signals (i.e., the amplified and filtered channel A output is split into A1 and A2, and the amplified and filtered channel B output is split into B1 and B2). A1 and B1 may then be fed to a diode detector 512 to retrieve audio range signals (20 Hz–20 KHz), may be conditioned (e.g., by using a low-pass, anti-aliasing filter 513), and may be converted to a digital signal (e.g., by using an A/D converter). A2 and B2 may be useful for further analysis. As shown in FIG. 5, each of the A2 and B2 signals are further amplified, and then fed to a diode detector 514 to retrieve audio range signals (20 Hz–20 KHz), may be conditioned (e.g., by using a low-pass, anti-aliasing filter 515), and may be converted to a digital signal (e.g., by using an A/D converter). A2 and B2 may be divided before the detector stage, so that the RF signals may be preserved for further analysis.

By analyzing the demodulating data, the present invention may reveal further information about the characteristics of the source of the RF signal. For example, further analysis may be used to determine the classification of the emitter type.

While FIG. 5 discloses the use of multiple phase shifters, it is possible to utilize the teachings of the present invention by eliminating one or more of the phase shifters. It is preferable to have at least one phase shifter in at least one arm. It is also preferable to have at least two phase shifters when trying to detect targets significantly off-center.

Figure 6:
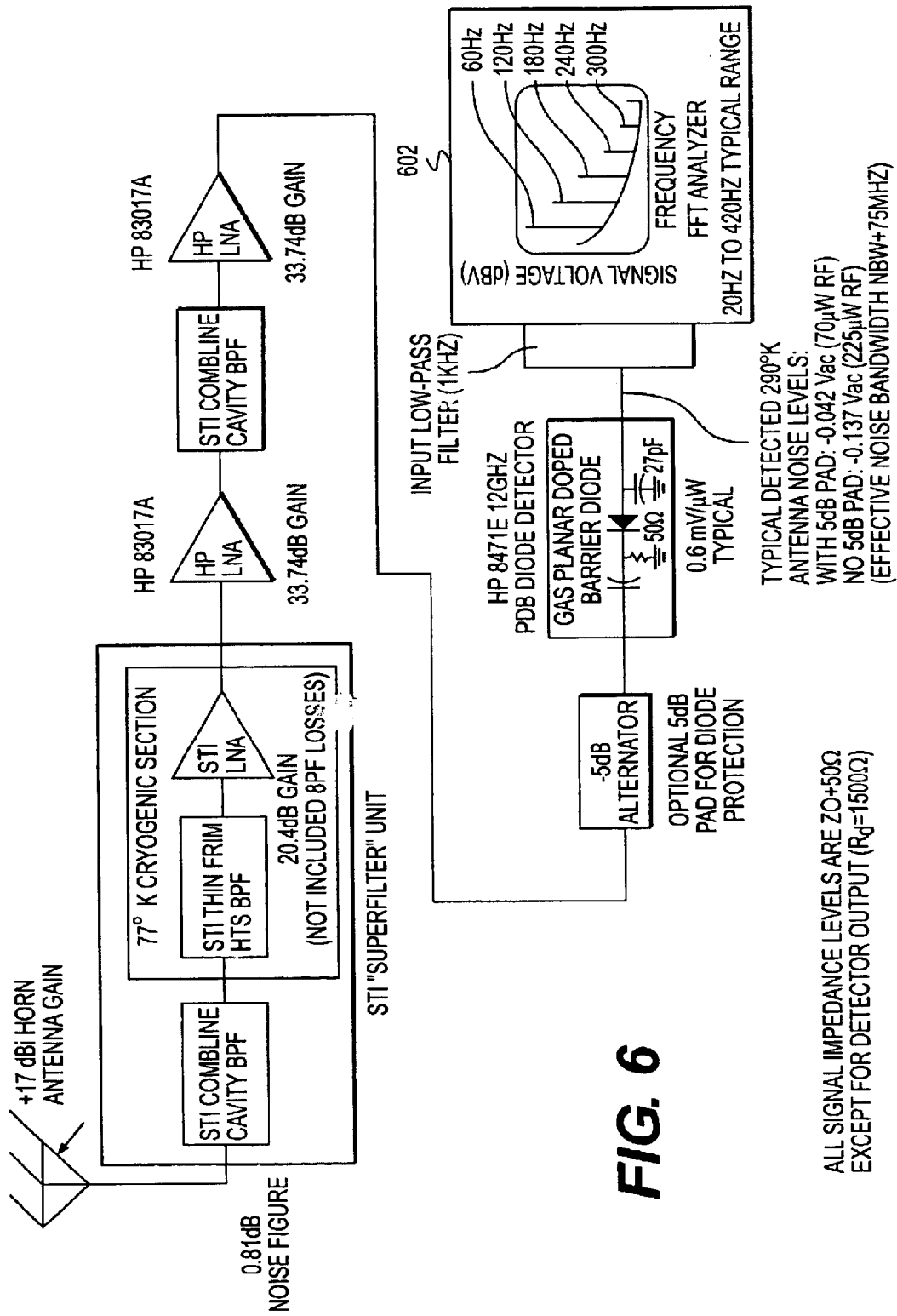
FIG. 6 An RF receiver for an embodiment of the invention.

As shown in FIG. 6, a FFT analyzer 602 may be used to analyze the audio data that has been detected by the receiver subsystem. The FFT analyzer 602, for example, can be used to study frequency data in the 20 Hz to 20 KHz, range, and preferably, in the 20 Hz to 240 Hz range, and more preferably at about the frequency of a likely AC source (e.g., 60 Hz in the U.S.A.), as well as its harmonics.

Embodiments of the invention concern a system for geolocating a source of an RF/microwave signal that includes two detection systems. The first detection system can be configured to include: an antenna assembly that generates at least two antenna beams, each of said at least two antenna beams generating an output signal; a receiver for each of the at least two antenna beams to receive the output signals from the antenna assembly; at least one crystal detector for each output signal, each crystal detector detecting amplitude modulations that may be present on the RF signal; an analog to digital converter to convert the detected amplitude modulations to digital data; and a processor that processes the digital data to determine a first angular location of the source of the RF signal relative to the first detection system. The second detection system can be configured to include: an antenna assembly that generates at least two antenna beams, each of said at least two antenna beams generating an output signal; a receiver for each of the at least two antenna beams to receive the output signals from the antenna assembly; at least one crystal detector for each output signal, each crystal detector detecting amplitude modulations that may be present on the RF signal; an analog to digital converter to convert the detected amplitude modulations to digital data; and a processor that processes the digital data to determine a second angular location of the source of the RF signal relative to the second detection system. The first detection system may be spaced apart from the second detection system such that the range of the source of the RF signal can be determined using the first angular location, the second angular location, the location of the first detection system, and the location of the second detection system.

Embodiments of the invention also relate to methods for geolocating a source of an RF or microwave signal having amplitude modulations, which methods include the use of two antenna assemblies. With reference to the first antenna assembly, the steps may include: locating a first antenna assembly at a known location relative to a second antenna assembly; receiving the RF signal using the first antenna assembly and generating a first output signal; detecting amplitude modulations from the first output signal; converting the amplitude modulations into digital data; and processing the digital data to determine an angular location of the source of the RF signal relative to first antenna assembly. With reference to the second antenna assembly, the steps may include: receiving the RF signal using the second antenna assembly and generating a second output signal; detecting amplitude modulations from the second output signal; converting the amplitude modulations into digital data; and processing the digital data to determine an angular location of the source of the RF signal relative to second antenna assembly. Thereafter, the range and location of the source of the RF signal may be determined using the first angular location, the second angular location, and the relative locations of the first antenna assembly and the second antenna assembly.

Other embodiments and uses of the invention will be apparent to those skilled in the art from consideration of the specification and practice of the invention disclosed herein. The specification and examples should be considered exemplary only with the true scope and spirit of the invention indicated by the following claims. Al references cited herein for any reason, including Provisional Application No. 60/279,114, and U.S. Pat. Nos. 5,206,654; 5,113,278; 4,972,431; 5,471,215; 5,541,606; 5,565,870; 5,602,554; 5,774,829; 5,365,450; 5,815,538; 6,018,312; and 6,018,317 are hereby incorporated by reference in their entireties. As will be easily understood by those of ordinary skill in the art, variations and modifications of each of the disclosed embodiments can be easily made within the scope of this invention as defined by the following claims.

What is claimed is:

1. A system for analyzing an amplitude-modulated signal, comprising:
    an antenna array that generates at least two antenna beams and an output signal for each of the at least two antenna beams;
    an RF subsystem that processes the outputs for each of the at least two antenna beams and produces at least two channel outputs; and
    a computational subsystem comprising a detector to detect amplitude modulations optionally superimposed on the amplitude-modulated signal, an analog-to-digital converter to generate digital output data, and a digital signal processing unit to analyze said digital output data to characterize a source of the amplitude-modulated signal.

2. The system of claim 1, wherein the antenna array comprises a 16-element phased antenna array.

3. The system of claim 2, wherein the 16-element phased antenna array is configured to generate two 8-element phased antenna arrays.

4. The system of claim 3, wherein the two 8-element phased antenna arrays operate to simultaneously provide the at least two channel outputs representing the at least two antenna beams having a squint angle.

5. The system of claim 4, where the squint angle ranges from about ±1° to about ±10°.

6. The system of claim 4, where the squint angle has a value of about ±2°.

7. The system of claim 4, where the squint angle has a value of about ±3.2.

8. The system of claim 4, wherein the at least two antenna beams have a beam width of about 1° to about 20°.

9. The system of claim 4, wherein the at least two antenna beams have a beam width of about 2° to about 10°.

10. The system of claim 4, wherein the at least two antenna beams have a beam width of about 5° to about 7°.

11. The system of claim 4, wherein the at least two antenna beams have a beam width of about 6.4°.

12. The system of claim 1, wherein the digital signal processing unit comprises software that analyzes said digital output data to determine a location of the source of the amplitude-modulated signal.

13. The system of claim 1, wherein the digital signal processing unit comprises software that analyzes said digital output data and tracks a relative location of the source of the amplitude-modulated signal.

14. The system of claim 1, wherein the digital signal processing unit comprises an FFT processor that analyzes said digital output data to determine a location of the source of the amplitude-modulated signal.

15. The system of claim 14, further comprising:
    a display capable of displaying an output from the FFT processor.

16. The system of claim 14, further comprising:
    a display that is capable of displaying a location of a source of an amplitude-modulated signal.

17. The system of claim 14, wherein the RF subsystem is designed to operate upon RF/microwave signal having a frequency of about 2.5 GHz.

18. A system for analyzing an RF/microwave signal, comprising:
    an antenna assembly that generates at least two antenna beams, each of said at least two antenna beams generating an output signal;
    a receiver for each of the at least two antenna beams to receive output signals from the antenna assembly;
    at least one crystal detector for each output signal, each crystal detector detecting amplitude modulations optionally present on the RF/microwave signal;
    an analog to digital converter to convert the detected amplitude modulations to digital data; and
    a digital signal processor that processes the digital data to determine directional information for a source of the RF/microwave signal.

19. The system of claim 18, wherein each receiver comprises:
    an amplifier with a gain G for amplifying the output signals from the antenna assembly; and
    a band pass filter wherein gain G is at least 65 dB.

20. The system of claim 18, wherein each receiver comprises:
    at least two amplifiers for amplifying the output signal from the antenna assembly; and
    at least one band pass filter wherein the at least two amplifiers and the at least one band pass filter are configured to operate with an overall gain G of at least 65 dB.

21. The system of claim 18, wherein the antenna assembly is configured to operate in at least two modes:
   search mode, wherein the antenna assembly generates at least eight beams to scan at least one of a horizontal direction and a vertical direction; and
   precision mode, wherein the antenna assembly generates two antenna beams.

22. The system of claim 18, wherein the antenna assembly and the receiver are configured to operate on frequencies in the range of about 1 GHz to about 5 GHz, and wherein the at least one crystal detector is selected to detect frequencies in the range of 20 Hz to 10 KHz.

23. The system of claim 18, wherein the antenna assembly and the receiver are configured to operate on frequencies in the range of about 2.4 GHz to about 2.5 GHz, and wherein the at least one crystal detector is configured to detect frequencies in the range of about 50 Hz to 180 Hz.

24. The system of claim 18, further comprising:
   a switching unit that interacts between the antenna assembly and the receivers to rapidly switch the output signals between the receivers to minimize the effect of gain differences between receiver channels.

25. The system of claim 18, wherein the digital signal processor comprises FFT algorithms that analyze the digital data to determine location information of the source of the RF/microwave signal.

26. The system of claim 18, wherein the system contains at least two crystal detectors for each output signal, and wherein each receiver comprises:
   at least two amplifiers for amplifying the output signal from the antenna assembly; and
   at least one band pass filter wherein the at least two amplifiers and the at least one band pass filter are configured to operate with an overall gain G of at least 65 dB, and wherein each of the at least two crystal detectors is configured to detect amplitude modulations at each output stage from the at least two amplifiers.

27. A radio direction finder system for determining location information for a source of an RF/microwave signal, comprising:
   an antenna assembly that generates a first and a second antenna beam, the first and second antenna beams generating a first and second RF output digital signals, respectively;
   a first receiver for receiving the first RF output signal;
   a second receiver for receiving the second RF output signal;
   a first AM detector that extracts amplitude variations from the first RF output signal to generate a first detected signal;
   a second AM detector that extracts amplitude variations from the second RF output signal to generate a second detected signal; and
   a digital signal processor that determines directional information from the first and second detected signals.

28. The radio direction finder system of claim 27, wherein the antenna assembly comprises:
   a phased antenna array having an even number N elements, each of the N elements generating an element output signal, and N being a multiple of 2;
   two multiple-input RF combiners, each of which combines the element output signals from N/2 elements to create a combined RF output signal;
   two power splitters to divide each of the combined RF output signals into a first divided RF output signal and a second divided RF output signal;
   a first power combiner to combine each of the first divided RF output signals into a first RF output signal; and
   a second power combiner to combine each of the second divided RF output signals into a second RF output signal wherein the digital signal processor uses FFT algorithms to analyze the information provided from the first and second detected signals to determine location information.

29. The radio direction finder system of claim 27, wherein each of the first and second AM detectors comprise a diode detector.

30. The radio direction finder system of claim 27, wherein the system is configured to operate from a moving platform.

31. A system for analyzing an RF/microwave signal, comprising:
   an antenna assembly that generates at least two antenna beams, each of said at least two antenna beams generating an RF output signal;
   a receiver for each of the at least two antenna beams to receive the RF output signals from the antenna assembly;
   at least one crystal detector to detect amplitude modulations that may be present on the RF/microwave signal;
   an analog to digital converter to convert the detected amplitude modulations to digital data; and
   a digital signal processor that processes the digital data to determine information about a source of the RF/microwave signal.

32. The system of claim 31, wherein the antenna assembly comprises:
   a phased antenna array having an even number N elements, each of the N elements generating an element output signal;
   N2 multiple-input RF combiners, each of which combines the element output signals from N1 elements to create a combined RF output signal, N, N1, and N2 being chosen such that N1 is a factor of N and N1 is an integer less than or equal to N/2, and N2 is an integer equal to N/N1;
   at least two power splitters to divide each of the combined RF output signals into at least two divided RF output signals; and
   at least two power combiners to combine at least two divided RF output signals into RF output signals.

33. The system of claim 31, wherein the processor comprises software comprising FET algorithms to analyze the digital data to determine location information about a source of the RF/microwave signal.

34. The system of claim 31, wherein the processor comprises:
   software that utilizes digital signal processing to analyze the digital data to determine information about identity of the source of the RF/microwave signal.

35. The system of claim 31, wherein the processor comprises software comprising FFT algorithms to maximizes a signal-to-noise ratio of a detected signal.

36. The receiver of claim 31, further comprising at least one spectrum analyzer.

37. A method for characterizing a source of an RF signal having amplitude modulations, comprising:
   receiving an RF signal;
   filtering the RF signal;
   amplifying the filtered RF signal;
   detecting amplitude modulations from the filtered RF signal;

converting the amplitude modulations into digital data; and processing the digital data utilizing digital signal processing to characterize a source of the RF signal to maximize a signal-to-noise ratio of a detected signal.

38. The method of claim 37, wherein the step of processing the digital data further comprises processing the digital data to determine directional information about the source of the RF signal.

39. The method of claim 37, wherein the step of processing the digital data further comprises processing the digital data to determine a classification for the source for the RF signal.

40. The method of claim 37, wherein the step of detecting amplitude modulations from the filtered signal is accomplished with a diode detector.

41. The method of claim 37, wherein the RF signal detected has a signal frequency in a microwave frequency band.

42. A method for analyzing a source of an RF signal having amplitude modulations, comprising:

providing a first antenna beam from a phased antenna array, the first antenna beam having a first beam width;

providing a second antenna beam from a second phased antenna array, the second antenna beam having a second beam width and being offset from the first antenna beam by a squint angle, said first antenna beam overlapping at least partially with said second antenna beam;

searching for an RF signal by manipulating the first and second antenna beams; and detecting amplitude modulations from the RF signal;

converting the amplitude modulations with an analog to digital converter to generate digital data; and analyzing the digital data to geolocate a source of the RF signal.

43. The method of claim 42, wherein the step of detecting amplitude modulations from the RF signal is accomplished with a diode detector.

44. A system for geolocating a source of an RF signal, comprising:

i) a first detection system comprising:

an antenna assembly that generates at least two antenna beams, each of said at least two antenna beams generating an output signal;

a receiver for each of the at least two antenna beams to receive the output signals from the antenna assembly;

at least one crystal detector for each output signal, each crystal detector detecting amplitude modulations optionally present on the RF signal;

an analog to digital converter to convert the detected amplitude modulations to digital data; and a digital signal processor that processes the digital data to determine a first angular location of the source of the RF signal relative to a second detection system; and ii) the second detection system comprising:

an antenna assembly that generates at least two antenna beams, each of said at least two antenna beams generating an output signal;

a receiver for each of the at least two antenna beams to receive the output signals from the antenna assembly;

at least one crystal detector for each output signal, each crystal detector detecting amplitude modulations optionally present on the RF signal;

an analog to digital converter to convert the detected amplitude modulations to digital data; and a digital signal processor that processes the digital data to determine a second angular location of the source of the RF signal relative to the first detection system;

whereby the first detection system is spaced apart from the second detection system such that the range of the source of the RF signal can be determined using the first angular location, the second angular location, the location of the first detection system, and the location of the second detection system.

45. The system for claim 44, wherein the RF signal being detected is a signal having a frequency in the microwave frequency band.

46. A method for geolocating a source of an RF signal having amplitude modulations, comprising:

locating a first antenna assembly at a known location relative to a second antenna assembly;

receiving the RF signal using the first antenna assembly and generating a first output signal;

detecting amplitude modulations from the first output signal;

converting the amplitude modulations into digital data; and processing the digital data to determine an angular location of the source of the RF signal relative to first antenna assembly;

receiving the RF signal using the second antenna assembly and generating a second output signal;

detecting amplitude modulations from the second output signal;

converting the amplitude modulations into digital data; and processing the digital data to determine an angular location of the source of the RF signal relative to second antenna assembly; and determining the range and location of the source of the RF signal using the first angular location, the second angular location, and the relative locations of the first antenna assembly and the second antenna assembly.

47. The system for claim 46, wherein the RF signal being detected is a signal having a frequency in the microwave frequency band.

48. A system for analyzing an RF/microwave signal, comprising:

an antenna assembly that generates at least one antenna beam that generates a left RF output signal;

an antenna assembly that generates at least one antenna beam that generates a right RF output signal;

a first RF splitter that splits the left RF output signal into a first component left RF signal and a second component left RF signal;

a second RF splitter that splits the right RF output signal into a first component right RF signal and a second component right RF signal;

a first RF phase shifter to shift a phase of the first component left RF signal;

a second RF phase shifter to shift a phase of the second component right RF signal;

a first RF combiner to combine the second component left RF signal with the phase-shifted second component right RF signal to create a second channel output;

a second RF combiner to combine the first component right RF signal with the phase-shifted first component left RF signal to create a first channel output;

a first receiver to receive the first channel output signal, said first receiver comprising:
- at least one crystal detector to detect amplitude modulations optionally present on the first channel output signal; and
- an analog to digital converter to convert the detected amplitude modulations to first channel digital data;

a second receiver to receive the second channel output signal, said second receiver comprising:
- at least one crystal detector to detect amplitude modulations optionally present on the second channel output signal; and
- an analog to digital converter to convert the detected amplitude modulations to second channel digital data; and
- a digital signal processor that processes the first channel digital data and the second channel digital data to determine information about a source of the RF/microwave signal.

49. A The system of claim 48 analyzing the RF/microwave signal, wherein the digital signal processor comprising FFT algorithms to analyze the first channel digital data and the second channel digital data to determine location information about the source of the RF/microwave signal.

50. The system of claim 48 for analyzing the RF/microwave signal, wherein the first RF phase shifter and the second RF phase shifter shift their input signals by approximately equal and opposite phase angles.

51. The system of claim 50 for analyzing the RF/microwave signal, wherein one of the first RF phase shifter and the second RF phase shifter operates at +60 degrees and the other operates at −60 degrees.

52. The system of claim 50 for analyzing the RF/microwave signal, wherein one of the first RF phase shifter and the second RF phase shifter operates at +90 degrees and the other operates at −90 degrees.

53. The system of claim 48 for analyzing the RF/microwave signal, further comprising:
- a third RF phase shifter to shift the phase of the first component right RF signal before said first component right RF signal is combined by the second RF combiner; and
- a fourth RF phase shifter to shift the phase of the second component left RF signal before said second component left RF signal is combined by the first RF combiner.

* * * * *